United States Patent [19]

Fisher et al.

[11] Patent Number: 5,870,732
[45] Date of Patent: Feb. 9, 1999

[54] INVENTORY METHOD FOR LOGICAL VOLUMES IN AN AUTOMATED STORAGE LIBRARY

[75] Inventors: James Arthur Fisher; Christine Lynette Fosler, both of Tucson, Ariz.

[73] Assignee: International Business Machines Corporation, Armonk, N.Y.

[21] Appl. No.: 752,373

[22] Filed: Dec. 4, 1996

[51] Int. Cl.⁶ .................................................. G06F 17/30
[52] U.S. Cl. .............................................. 707/1; 711/100
[58] Field of Search ..................... 707/1, 2, 3, 7, 707/8, 9, 10, 100, 200, 206, 5, 104; 711/111, 100, 114; 360/92; 414/277, 753; 364/478.03

[56] References Cited

U.S. PATENT DOCUMENTS

| | | | |
|---|---|---|---|
| 4,310,883 | 1/1982 | Clifton et al. | 364/200 |
| 4,864,438 | 9/1989 | Munro | 360/92 |
| 4,876,662 | 10/1989 | Pence | 364/900 |
| 4,945,429 | 7/1990 | Munro et al. | 360/92 |
| 5,164,909 | 11/1992 | Leonhardt et al. | 364/478.03 |
| 5,336,030 | 8/1994 | Ostwald et al. | 414/277 |
| 5,386,516 | 1/1995 | Monahan et al. | 395/275 |
| 5,388,260 | 2/1995 | Monahan et al. | 395/600 |
| 5,416,914 | 5/1995 | Korngiebel et al. | 711/114 |
| 5,421,697 | 6/1995 | Ostwald | 414/753 |
| 5,546,557 | 8/1996 | Allen et al. | 395/438 |

*Primary Examiner*—Paul R. Lintz
*Assistant Examiner*—Ruay Lian Ho
*Attorney, Agent, or Firm*—John H. Holcombe; Robert M. Sullivan

[57] ABSTRACT

In an automated virtual storage and retrieval library, a method for creating a new inventory of physical media volumes (cartridges) and of related logical volumes stored on the physical media, which method exports the existing logical volume records from a stored table to a file via a data base program, deletes the existing physical and logical volume records from the table, then imports the logical volume records from the file via the data base program into a new table, operates the library accessor to scan all the library cells to read the labels of all the physical media volumes (cartridges) in the cells, inserting physical volume records therefor into the stored table, and indicates to a host that the library is online. The copies of only the inserted physical volume records are uploaded to the host, providing a dramatic savings in processing time before the library is available for normal accessing.

28 Claims, 5 Drawing Sheets

CARTRIDGE TABLE

| VOLSER | CATEGORY | CELLXY | HOMEXY | MOUNTS | MEDIA TYPE | INDICATORS |
|---|---|---|---|---|---|---|
| | | | | | | |

FIG. 6

INVENTORY METHOD FOR LOGICAL VOLUMES IN AN AUTOMATED STORAGE LIBRARY

DOCUMENTS INCORPORATED BY REFERENCE

Commonly assigned U.S. Pat. No. 5,546,557 is incorporated for its showing of a system for storing and managing plural logical volumes in each of several physical media volumes in an automated data storage library.

Commonly assigned U.S. patent application Ser. No. (08/340,406, filed Nov. 15, 1994 now abandoned), entitled "Volume Stacking Contention Resolution in an Automated Storage Library", is incorporated for its showing of an automated storage library having a library manager computer system for operating the library and for handling the logical and physical volumes.

FIELD OF THE INVENTION

The present invention relates to the management of physical media volumes and of logical volumes in an automated virtual data storage and retrieval library, and, in particular, to creating a new inventory of physical media volumes and of related logical volumes.

BACKGROUND OF THE INVENTION

Computer data to be stored on removable media is typically arranged in data volume units that originally corresponded to one data storage media, such as a reel of tape or tape cartridge or cassette, or an optical disk or cartridge. The capacity of such storage media has grown substantially in recent years. Thus, the average size of data sets in most computer or data processing centers is significantly less than the capacity of the data storage media volumes. Most programming support for peripheral data storage is directed at only the original volume units and does not provide a general solution to storing multiple data sets in the same volume. Consequently, the potential capacity of removable data storage volumes is not realized because a single small data set is stored in one volume, leaving the remainder of the volume unused. It will be appreciated that in an automated storage and retrieval library, the cost of the system includes the cost of the unused media as well as the cost of storing the unused portion in the library.

A recent development for better utilizing the full capacity of a removable media cartridge (also called a media volume or a physical volume) is to store multiple volumes (called virtual or logical volumes) on a single physical volume. Data which would have been stored in multiple, mostly unused physical volumes are collected and stored on a single physical volume in separately addressable, host-processor defined logical data storage volumes. Both the '557 patent and the coassigned application describe the creation and management of such logical volumes and the associated physical volumes in an automated virtual storage and retrieval library. As the result, the host processor treats only logical volumes as though they were separate physical media volumes, and the library manages the access to the logical volumes by accessing the associated physical volumes: A subsystem providing automatic management of tape data storage having such logical volumes is called a Virtual Tape Server. As can be appreciated, the management of contention for disparate logical volumes on the same physical volume can be very difficult. The documents incorporated by reference are directed to providing solutions to these problems by such a Virtual Tape Server. The patents describe establishment of a stored table of logical volume records and of physical volume records for managing the data storage.

A helpful tool in managing the massive numbers of logical volumes that can be stored in such libraries is the concept of "Categories". As described in the '557 patent, a category may be defined for data storage volumes having a common attribute. Some common attributes include scratch volumes, expiration dates, common user, type of volume, host-processor data related to a job or set of jobs, volumes to be transferred or migrated to a scratch category, etc. A set of logical volumes may be selected for use by calling for a category, which will select any volume in the category. One example is mounting one volume from a scratch category on a drive of the library.

Presently, the average number of logical volumes contained in a single physical volume is approximately 50. The number of cartridges in a typical tape library is 1,000, with the result that a typical Virtual Tape Server tape library, such as the IBM 3494, contains 50,000 logical volumes. A library initially containing empty cartridges will gradually add data and fill the physical volumes with logical volumes as described in the '557 patent. In addition, some cartridges will be taken offline, out of the library and placed in shelf storage, and be replaced by new cartridges. Also, some data will be replaced or reorganized such that cartridges will become available for reuse as though new. Management of the data storage table for tracking the logical and physical volumes is accomplished by the Virtual Tape Server.

On occasion, the library may be reconfigured by expansion, shrinkage, repair, addition of drives or of a large group cartridges. In such instances, the library cannot gradually accomplish a corresponding reconfiguration of the data storage table, and the host has no way of tracking the physical and logical volumes stored in the library. Thus, the library must be taken offline and be reinventoried.

Each physical or logical volume that is inventoried requires a finite amount of time to be added to the inventory. The large number of physical volumes and the much larger number of logical volumes require that the library be offline and unavailable for use an unacceptable length of time while the new inventory is made and is uploaded to the host processor.

What is required is a way of shortcutting the inventory process, and allowing the library to be back on line and available for use much sooner than previously possible.

SUMMARY OF THE INVENTION

What is disclosed is a method for creating a new inventory of physical media volumes and of related logical volumes stored on the physical media in an automated virtual storage library, which method exports the existing logical volume records from a stored table to a file via a data base program, deletes the existing physical and logical volume records from the table, then imports the logical volume records from the file via the data base program into a new table, operates the library accessor to scan all the library cells to read the labels of all the physical media volumes in the cells, inserting physical volume records therefor into the stored table, and indicates to a host that the library is online. The copies of only the inserted physical volume records are uploaded to the host, providing a dramatic savings in processing time before the library is available for normal accessing.

For a fuller understanding of the present invention, reference should be made to the following detailed description taken in conjunction with the accompanying drawings.

DESCRIPTION

Figure 1:
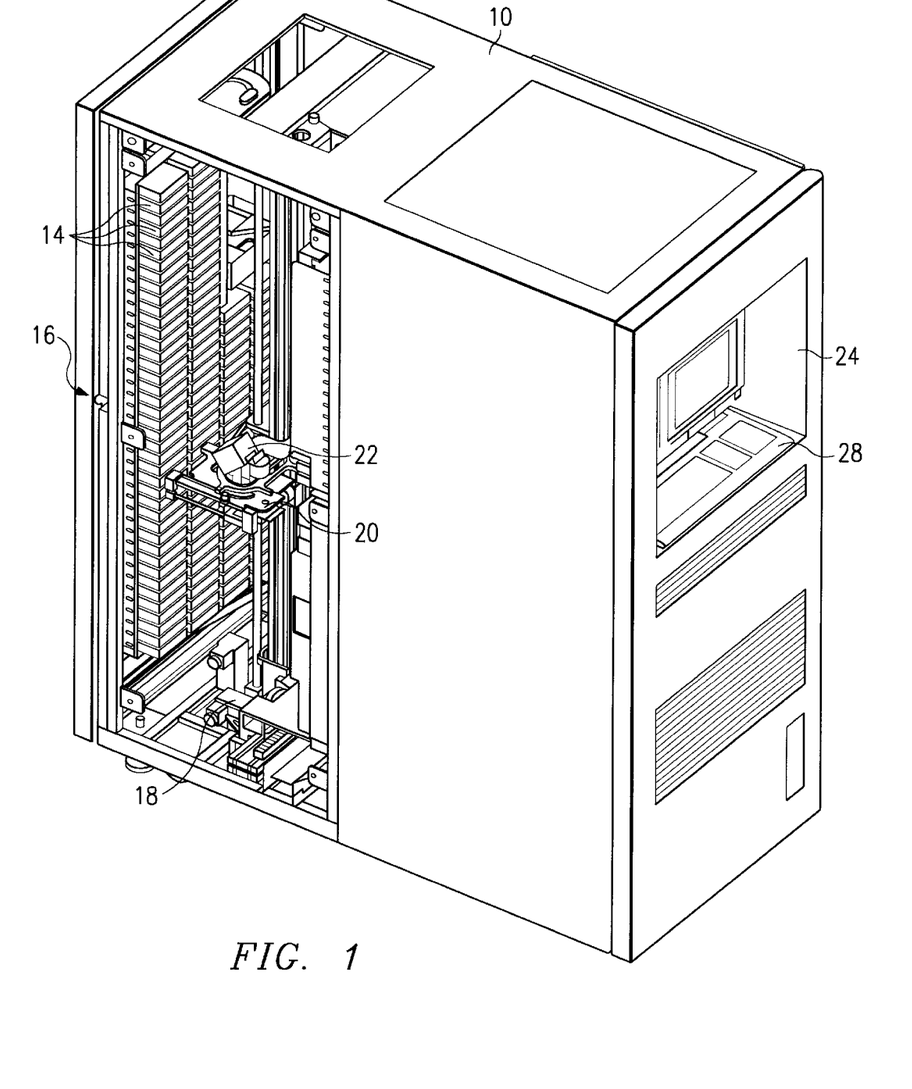
FIG. 1 is an isometric view of an automated virtual storage and retrieval library of the present invention.
Figure 2:
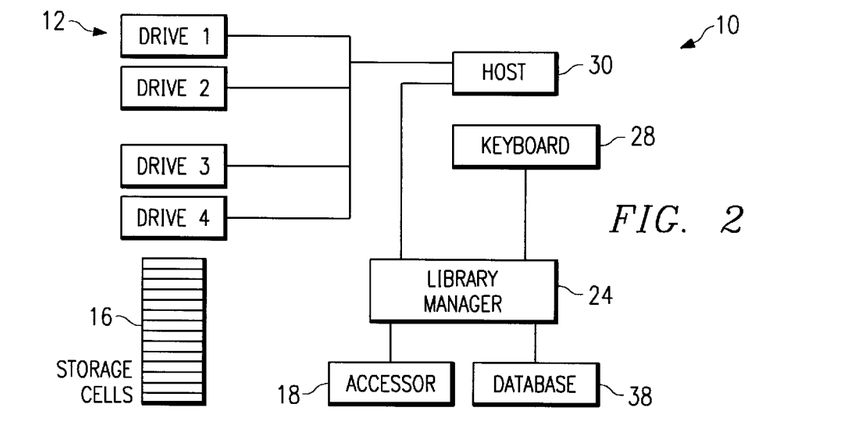
FIG. 2 is a block diagram of an embodiment of the library of FIG. 1.

FIG. 1 is an isometric view, and FIG. 2 is a block diagram, of an automated virtual information storage and retrieval library 10 for storing and accessing data storage media capable of having plural logical data volumes thereon. The library 10 includes one or more data drive units 12, media cartridges 14 stored in cells 16, an accessor 18, and a library manager 24. The accessor 18 transports a selected cartridge 14 between a storage cell 16 and a drive 12. The accessor 18 includes a cartridge gripper 20 and a bar code scanner 22, or similar vision system, mounted on the gripper 20, to "read" identifying cartridge labels. The drives 12 can be optical disk drives or magnetic tape drives and the cartridges can contain optical or magnetic media, respectively, or any other removable media and associated drives.

The library manager 24, which includes at least one computing processor, is interconnected with, and controls the actions of, the drives 12 (through their associated controllers) and the accessor 18. The library manager is also provided with a keyboard 28 and is interconnected through a provided interface to one or more host processors 30. Data access commands and information to be recorded on, or to be read from, selected cartridges 14 are transmitted directly between the drives 12 and the host. Library manager 24 is provided with a database 38, which includes storage (typically one or more hard disk drives) for tables and programs.

Figure 3:
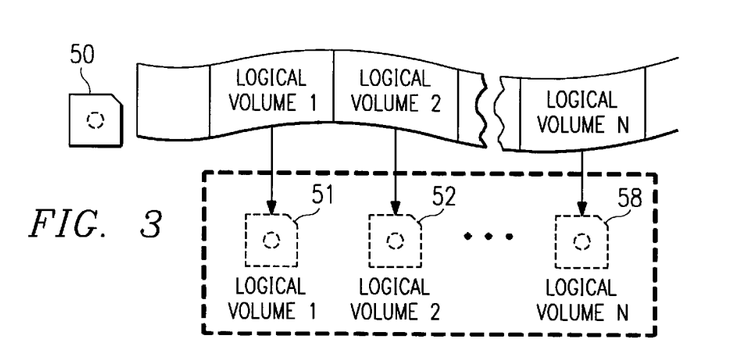
FIG. 3 is a generalized diagram of logical volumes stored on a single physical media volume for use in the library of FIG. 1.

FIG. 3 is a schematic representation of a physical media volume 50, such as a magnetic tape in a cartridge, which contains N logical volumes, thereby replacing N individual tape cartridges 51 through 58. As described in assignee's copending application, the storage of multiple logical volumes in a single physical volume is called "volume stacking". In one configuration, a single physical volume can include up to 140 logical volumes of 50 MB each, each of which can be individually addressed and accessed. In another configuration a single physical volume can include a variable number of logical volumes of variable size, each of which can be individually addressed and accessed.

The key identifier for both logical volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library accessor. Thus, physical volume 50 will have a VOLSER as will the logical volumes 51 through 58. Host processors 30 maintain a system volume catalog of the volumes by VOLSER and having other data relating to the volumes. Each logical volume appears as an addressable data storing volume to the host processor that is mountable in one of the drives 12 in the library.

Figure 4:
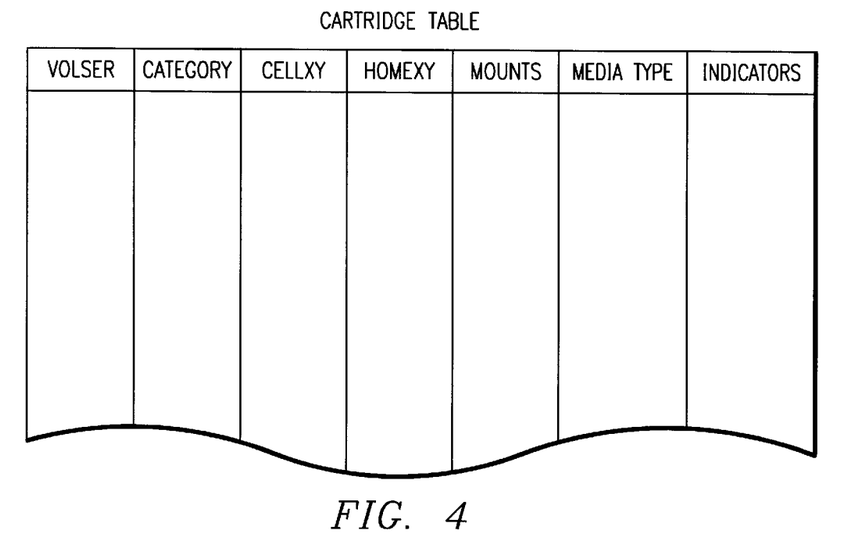
FIG. 4 is a diagram of a data storage table (cartridge table) for the library of FIG. 1.

FIG. 4 is a diagram of a data storage table (cartridge table) for the library of FIG. 1. The cartridge table is stored in database 38 and provides data regarding the status of all the volumes in the library, logical and physical. One line of the cartridge table as illustrated represents one volume. The first column in the table is the VOLSER as described above.

The second column is the category of the volume. As described above, the host may assign volumes into logical groups called "categories". Some common attributes for the logical groups include scratch volumes, expiration dates, common user, type of volume, host-processor data related to a job or set of jobs, volumes to be transferred or migrated to a scratch category, etc.

The "CELLXY" column is the coordinates of the cell 16 where the cartridge is stored at the present time.

The "HOMEXY" column is the coordinates of the "home cell" for this VOLSER. All logical volumes are assigned the same HOMEXY. If the library is in fixed home cell mode, the physical volume HOMEXY is not changed during library manager operation. In floating home cell mode, the HOMEXY is updated every time the cartridge is swapped at a rack cell. During a swap, the HOMEXY of the two cartridges involved in the swap are swapped. This ensures that every cartridge has a unique homexy.

The next column, "MOUNTS", comprises the number of times this VOLSER has been mounted. It is incremented when a mount completes successfully.

The "MEDIA TYPE" column indicates whether a VOLSER is a logical volume or a physical volume. MEDIA TYPE may also indicate the type of physical volume in the type of library in which a plurality of types of cartridges can be stored in the library. Examples of different types of cartridges includes regular volumes, volumes with thin tape and greater capacity, etc. The media type is important for the present invention, but is ignored in normal operations of the library.

The last column illustrated is "INDICATORS" which many special identifiers arising during operation of the library. Examples include "misplaced" to identify that a volume could not be located; "unreadable" is used to identify that the VOLSER on the label is not readable by the vision system; "mounted" indicates that a command has been issued to mount the volume in a drive 12 and is reset only after a command is issued to demount the cartridge and transport the cartridge to a cell; "manual mode" indicates that the cartridge may have been handled by the operator and is reset only after the cartridge label has been read by the vision system; and "eject pending" indicates that the volume has been selected for ejection from the library, either singly or as part of a bulk ejection.

As discussed above, the number of logical volumes contained in a single physical volume can presently be as high as 140 volumes of 50 MB each in one configuration. In another configuration a single physical volume can include a variable number of logical volumes of variable size, each of which can be individually addressed and accessed. The average number of logical volumes in a single physical volume is approximately 50. The number of cartridges in an exemplary tape library is 1,000, with the result that an exemplary Virtual Tape Server library, such as the IBM 3494, contains 50,000 logical volumes. A library initially containing empty cartridges will gradually add data and fill the physical volumes with logical volumes as described in the '557 patent. In addition, some cartridges will be taken offline, "ejected" out of the library and placed in shelf storage, or archived, and be replaced by new cartridges. Also, some data will be replaced or reorganized such that cartridges will become available for reuse as though new.

On occasion, the library may be reconfigured by expansion, shrinkage, repair, addition of drives or of a large group cartridges. In such instances, the library cannot gradually accomplish a corresponding reconfiguration of the data storage table, and the host has no way of tracking the physical and logical volumes stored in the library. Thus, the library must be taken offline and be reinventoried. A reinventory is initiated from the keyboard 28 of the library manager.

PRIOR ART

Figure 5:
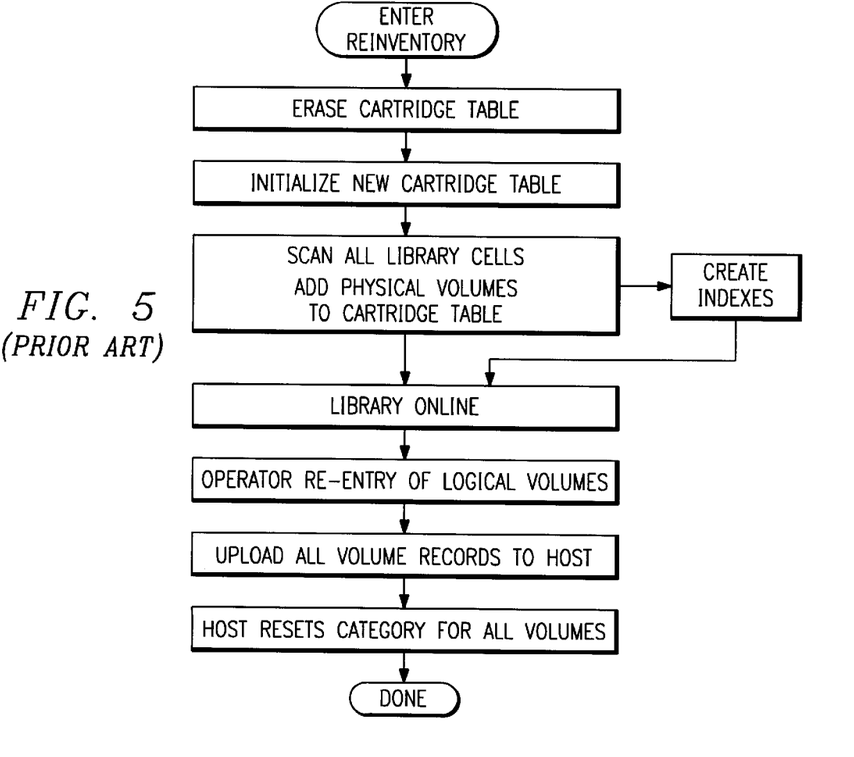
FIG. 5 is a flow chart of the prior art method for conducting a reinventory of the library of FIG. 1.

The prior art method for conducting the reinventory of the library 10 is illustrated in FIG. 5. The first step is to erase the cartridge table of FIG. 4. The erasure will allow existing open and presently unused data storage space otherwise occupied by the cartridge table that arose from previous deletions, etc., to be recovered when the table is reestablished.

The first step in reestablishing the table is the step of initializing the new cartridge table.

The library manager then operates the accessor 18 to cause bar code scanner 22, or similar vision system, mounted on the gripper 20, to scan every cell in the library and read every identifying cartridge label. Racks are scanned one rack at a time, one side of the aisle at a time, in a serpentine pattern. The library manager inserts a VOLSER record into the new cartridge table for each of the physical volume labels read by the scanner. The records include the CELLXY and HOMEXY for each cartridge to identify the associated cell. The CELLXY is the logical location of the cell in the format to be used by the library manager, and not the actual dimensional x, y and z location of the cell.

As the cartridge table is created, indexes are also created, comprising lists of the locations of rows of the cartridge table, sorted by the contents of one or more specified columns. Indexes are typically used to speed up access to a table. When completed, with both physical and logical volumes, the cartridge table will have approximately 51,000 records, requiring indexes to access the table in a reasonable time. Indexes can be created before or after loading the table with data. If the table being indexed is empty, a database manager program creates the index but does not create index entries until the table is loaded or rows are added. If the table is not empty, the database manager program creates the index entries at one time.

The library 10 may then be brought back online with only the physical volumes in the cartridge table. The library is online in order to allow the inventory to be uploaded to the host.

The operator must then conduct the re-entry of the logical volumes by entering ranges and allowing the library manager to insert the logical volume information as described in the '557 patent. The library manager then uploads all the volume records to the host 30. This is done approximately 100 records at a time. The host then resets the category for all volumes, one volume at a time.

Each physical or logical volume that is inventoried requires a finite amount of time to be added to the inventory. The large number of physical volumes and the much larger number of logical volumes require that the library be unavailable for use to access logical volumes an unacceptable length of time while the new inventory is made. In the typical library of 50,000 logical volumes, the operator re-entry of the logical volumes requires 3 hours, the uploading of all volume records to the host requires 8 hours, and the resetting of the categories for all volumes requires 12 hours.

PREFERRED EMBODIMENTS

Figure 6:
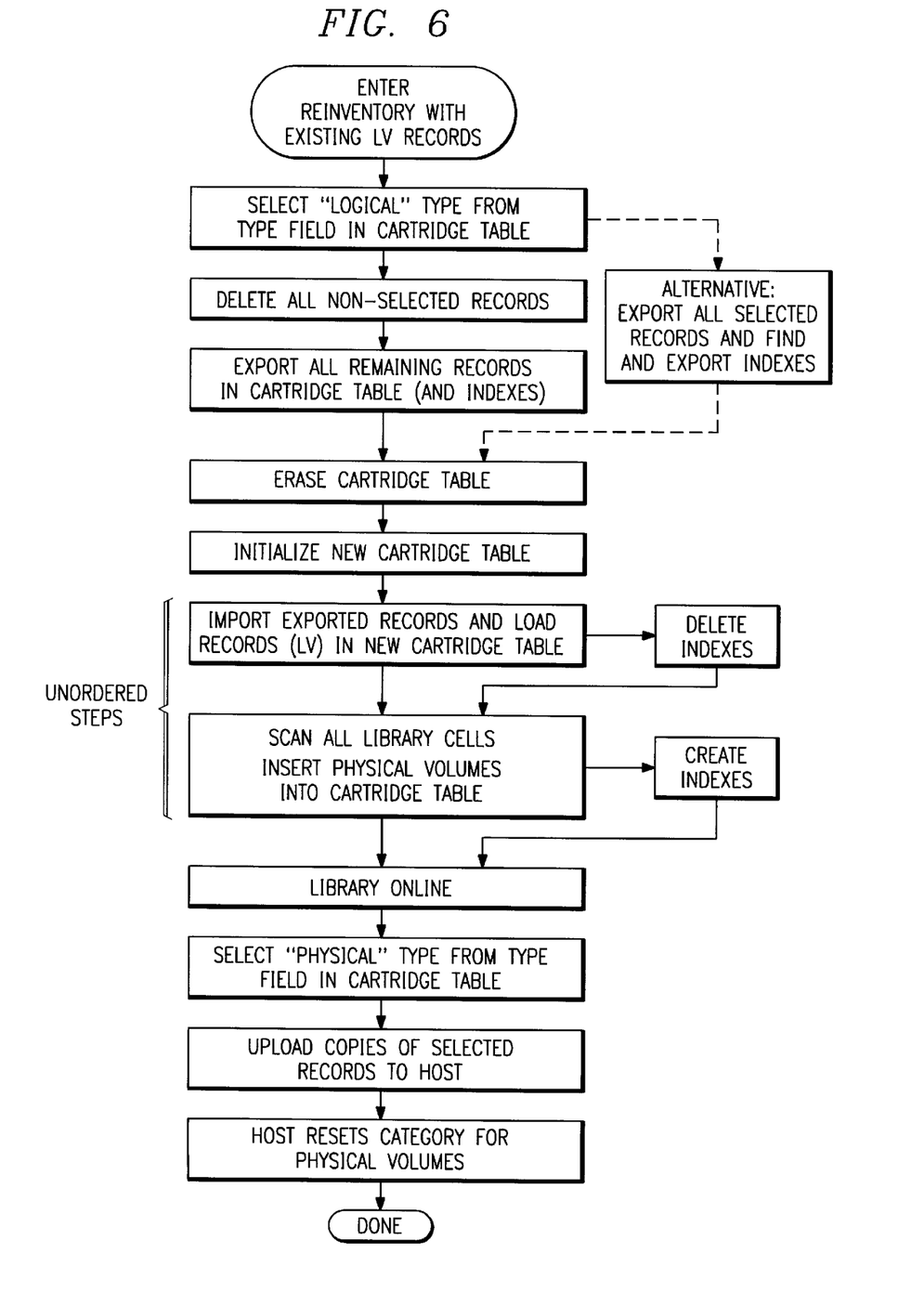
FIG. 6 is a flow chart of the method for conducting a reinventory of the library in accordance with the present invention.

FIG. 6 is a flow chart of a preferred embodiment of the method for conducting a reinventory of the library in accordance with the present invention. The method of the present invention comprises using the existing logical volume records to create the new cartridge table.

In the preferred embodiment of FIG. 6, upon entering the reinventory process by the operator as indicated at keyboard 28 in FIG. 2, the library manager 24 searches the "MEDIA TYPE" column of the cartridge table of FIG. 4 for each record to select the "logical" type volumes. In the next step, the library manager deletes all non-selected records. Then, all remaining records (the selected "logical" type volumes) in the cartridge table and, optionally the associated indexes, are exported to a binary file via a data base program of the library manager. An example of such a data base program is the commercially available "DB2" data base program from the assignee of the present invention, which data base program is widely used in the industry.

As an alternative, the selected "logical" type volume records could be directly exported to the file via a data base program as also shown in FIG. 6. However, the export function is somewhat more complicated, and the quicker approach is to perform the delete and then export all remaining records.

After the selected records have been exported to the file via the data base program, the cartridge table is erased. The erasure will make all the space available for the new table. There will be no more dead space that otherwise would need to be cleaned up and reorganized.

Similarly to the prior art flow chart, the new cartridge table is then initialized.

In two unordered steps, records are then inserted into the new cartridge table. The records that had been exported to the binary file via the data base program (logical volume records) are now imported and loaded into the new cartridge table. Instead of the 3 hour time frame required by the prior art operator for re-entry of the logical volume records, the import of the records only requires one hour. The import function of the data base program normally includes the sorting and organization into an organized format. Due to the previous erasure of the cartridge table and the export of the logical volume records, together with the optional indexes, the sort function can be turned off to save even more time, reducing the previous 3 hours to only 10 minutes.

The imported indexes are subsequently deleted.

As in the prior art, the library manager then operates the accessor 18 to cause bar code scanner 22, or similar vision system, to scan every cell in the library and read every identifying cartridge label. Racks are scanned one rack at a time, one side of the aisle at a time, in a serpentine pattern. The library manager inserts a VOLSER record into the new cartridge table for each of the physical volume labels read by the scanner. The records include the CELLXY for each cartridge to identify the associated cell.

New indexes are also created, comprising lists of the locations of rows of the cartridge table, sorted by the contents of one or more specified columns, the same as in the prior art. As described above, indexes can be created before or after loading the table with data. If the table being indexed is empty, a database manager program creates the index but does not create index entries until the table is loaded or rows are inserted. If the table is not empty, the database manager program creates the index entries at one time.

The reinventory is now complete and the library may be brought online.

The next step is to upload the inventoried physical volumes to the host 30. The reason is that the existing logical volumes had been exported and then imported and are thus the same as previously defined by the host. Thus, there is no need to replace the information of the host with identical information. As there are approximately one 50th the number of physical records as compared to the physical and logical records requiring uploading in the prior art, the upload process requires only 10 minutes as compared to 8 hours for the prior art.

The host then resets the categories for only the physical volumes. As in the previous step, the relatively small number of physical volumes as compared to the physical and logical volumes of the prior art reduces the processing time by a similar ratio. The time required for resetting the category for physical volumes only approximates 90 minutes as compared to the prior art 12 hours to reset all volumes. The total time for the reinventory becomes less than 2 hours as compared to 23 hours for the prior art.

Figure 7:
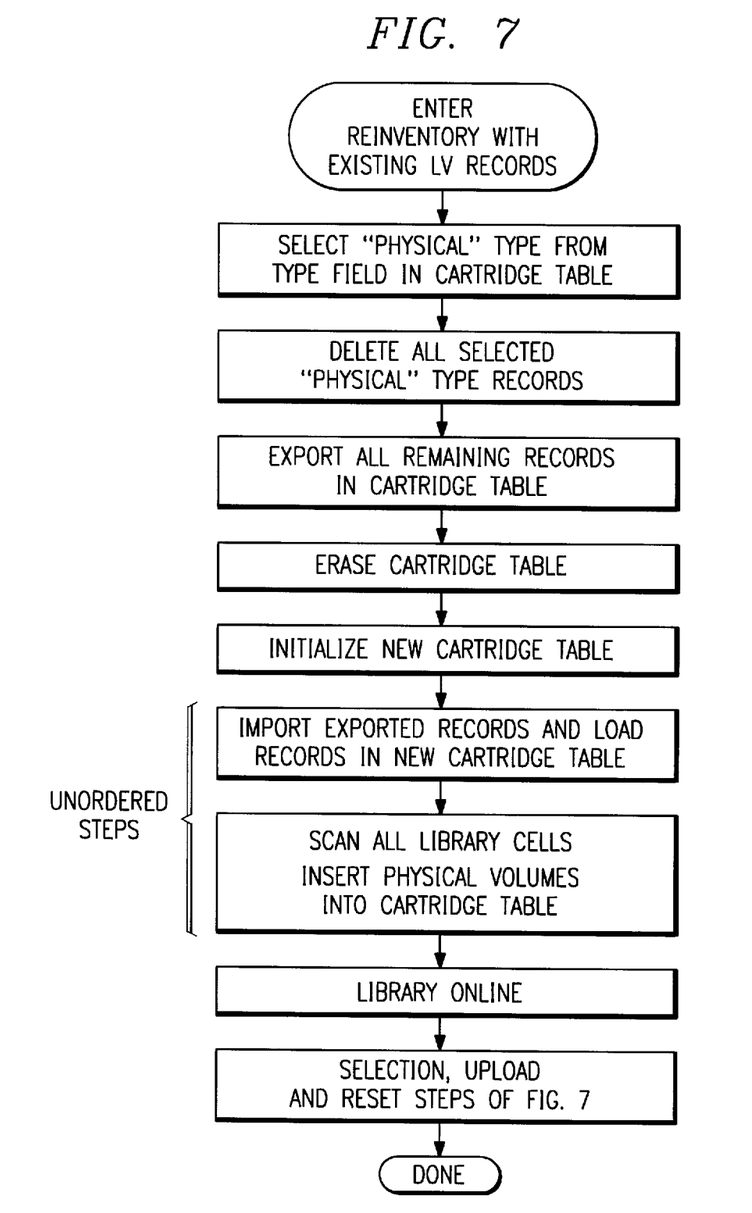
FIG. 7 is a flow chart of an alternative method for conducting a reinventory of the library in accordance with the present invention.

Still another alternative method for practicing the invention is shown in FIG. 7. In FIG. 7, the library manager 24 searches the "MEDIA TYPE" column of the cartridge table of FIG. 4 for each record to select the "physical" type volume records.

The selected "physical" type records are then deleted.

All the remaining records, primarily the logical volume records, are exported to a binary file via the data base program as in FIG. 6. A few extraneous records may also be included.

The cartridge table is then erased and the new cartridge table is initialized, also the same as in FIG. 6.

In unordered steps, the previously exported records are imported in the same manner as with respect to FIG. 6 as are the few extraneous records. All the library cells are scanned and the corresponding physical volume records are inserted into the cartridge table. The new cartridge table is thus slightly less efficient than that of FIG. 6.

The library is brought online and the selection, upload and reset steps of FIG. 6 are repeated in the method of FIG. 7.

Figure 8:
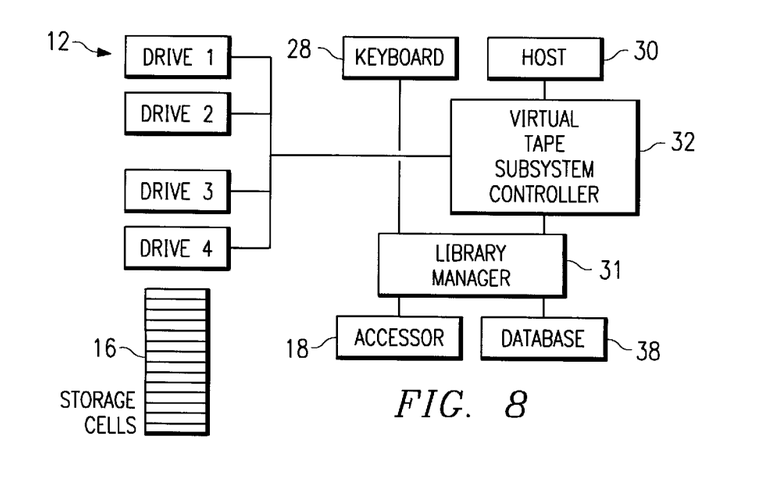
FIG. 8 is a block diagram of an alternative embodiment of the library of FIG. 1.

The library manager 24 has been described as including at least one computing processor. FIG. 8 illustrates a dual processor version of the library manager, wherein a primary library manager processor 31 handles much of the functions, and a second processor 32 handles other of the functions of the library manager of FIG. 2, as well as performing some of the functions of the host 30. As shown, the second processor is called the "virtual tape subsystem controller" and provides the interface to the host processor 30. The virtual tape subsystem controller provides commands from the host to the library manager 31 and reads the data accessed by the library manager from the drives 12. Keyboard 28 is still connected to library manager 31. The controller 32 also provides a table of the prior art which determines which physical volume, identified by VOLSER, contains the requested logical volume.

The method of the present invention has been illustrated in the best mode as a data processing program and implemented by data processor(s), it will be understood that other implementations are possible. The present invention has also been illustrated with a tape library manager, but other library configurations may use the invention equally, such as optical disk libraries and libraries for other similar media.

While the preferred embodiments of the present invention have been illustrated in detail, it should be apparent that modifications and adaptations to those embodiments may occur to one skilled in the art without departing from the scope of the present invention as set forth in the following claims.

What is claimed:

1. A method for creating a new inventory of physical media volumes and of related logical volumes for an automated virtual storage and retrieval library, the library having a library manager with a data base program, a plurality of library cells for storing said physical media volumes each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and an interface to a host, the method conducted in response to a command for taking a new inventory, the method comprising the steps of:

exporting all said existing logical volume records to a file via said data base program;

deleting all said existing volume records;

erasing said stored table;

initializing a new table;

importing said logical volume records from said file via said data base program into said new table;

operating said library manager and said accessor to scan all said library cells to read said labels of all said physical media volumes in said cells and insert physical volume records therefor into said stored table; and indicating to said host that said library is online.

2. The method of claim 1, wherein said importing and said operating steps are unordered.

3. The method of claim 1:

wherein said importing step additionally comprises deleting indexes associated with table; and wherein said operating step additionally comprises creating new indexes associated with said records in said stored table.

4. The method of claim 3, additionally comprising the step of:

uploading copies of said inserted physical volume records to said host.

5. A method for creating a new inventory of physical media volumes and of related logical volumes for an automated virtual storage and retrieval library, the library having a library manager with a data base program, a plurality of library cells for storing said physical media volumes each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records wherein said logical volume records and said physical volume records are identified by type identifiers therein, and an interface to a host, the method conducted in response to a command for taking a new inventory, the method comprising the steps of:

selecting all said records of said stored table having logical volume record type identifiers;

deleting all non-selected records in said stored table;

exporting all records remaining in said stored table to a file via said data base program;

erasing said stored table;

initializing a new table;

importing said logical volume records from said file via said data base program into said table;

operating said library manager and said accessor to scan all said library cells to read said labels of all said physical media volumes in said cells and insert physical volume records therefor into said stored table; and indicating to said host that said library is online.

6. The method of claim 5, wherein said importing and said operating steps are unordered.

7. The method of claim 5:

wherein said importing step additionally comprises deleting indexes associated with said imported records; and wherein said operating step additionally comprises creating new indexes associated with said records in said stored table.

8. The method of claim 7, additionally comprising the steps of:

selecting said records of said stored table having physical volume record type identifiers; and uploading copies of said selected records to said host.

9. A method for creating a new inventory of physical media volumes and of related logical volumes for an automated virtual storage and retrieval library, the library having a library manager with a data base program, a plurality of library cells for storing said physical media volumes each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records wherein said logical volume records and said physical volume records are identified by type identifiers therein, and an interface to a host, the method conducted in response to a command for taking a new inventory, the method comprising the steps of:

selecting all said records of said stored table having physical volume record type identifiers;

deleting all selected records in said stored table;

exporting all records remaining in said stored table to said data base program;

erasing said stored table;

initializing a new table;

importing said logical volume records from said file via said data base program into said table;

operating said library manager and said accessor to scan all said library cells to read said labels of all said physical media volumes in said cells and insert physical volume records therefor into said stored table; and indicating to said host that said library is online.

10. The method of claim 9, wherein said importing and said operating steps are unordered.

11. The method of claim 9:

wherein said importing step additionally comprises deleting indexes associated with said imported records; and wherein said operating step additionally comprises creating new indexes associated with said records in said stored table.

12. The method of claim 11, additionally comprising the steps of:

selecting said records of said stored table having physical volume record type identifiers; and uploading copies of said selected records to said host.

13. An automated virtual storage and retrieval library comprising:

a plurality of library cells for storing physical media volumes each physical media volume having from none to a plurality of logical volumes located thereon;

at least one drive unit;

at least one accessor for accessing said library cells and reading labels of said physical media volumes and for transporting said physical media volumes between said drive unit and said cells;

an interface to a host; and a) a library manager connected to said interface and connected for operating said drive unit and said accessor, said library manager having a data base program and a stored table of existing logical volume records and of existing physical volume records, said library manager responding to a command ordering a new inventory;

b) for exporting all said existing logical volume records to a file via said data base program;

c) for deleting said existing physical volume records;

d) for erasing said stored table;

e) for initializing a new table;

f) for importing said logical volume records from said file via said data base program into said table;

g) for operating said accessor to scan all said library cells to read said labels of all said physical media volumes in said cells;

h) for inserting physical volume records for said read physical media volumes into said stored table; and i) for indicating to said host at said interface that said library is online.

14. The automated virtual storage and retrieval library of claim 13, wherein:

said library manager additionally uploads copies of at least said inserted physical volume records to said host at said interface.

15. The automated virtual storage and retrieval library of claim 14, wherein said library manager comprises at least one programmed computer.

16. An automated virtual storage and retrieval library comprising:

a plurality of library cells for storing physical media volumes each physical media volume having from none to a plurality of logical volumes located thereon;

at least one drive unit;

at least one accessor for accessing said library cells and reading labels of said physical media volumes and for transporting said physical media volumes between said drive unit and said cells;

an interface to a host; and a) a library manager connected to said interface and connected for operating said drive unit and said accessor, said library manager having a data base program and a stored table of existing logical volume records and of existing physical volume records wherein said logical volume records and said physical volume records are identified by type identifiers therein, said library manager responding to a command ordering a new inventory;

b) for selecting all said records of said stored table having logical volume record type identifiers;

c) for deleting all non-selected records in said stored table;

d) for exporting all records remaining in said stored table to a file via said data base program;

e) for erasing said stored table;

f) for initializing a new table;

g) for importing said logical volume records from said file via said data base program into said table;

h) for operating said accessor to scan all said library cells to read said labels of all said physical media volumes in said cells;

i) for inserting physical volume records for said read physical media volumes into said stored table; and for indicating to said host at said interface that said library is online.

17. The automated virtual storage and retrieval library of claim 16, wherein said library manager additionally:

selects said records of said stored table having physical volume record type identifiers; and uploads copies of said selected records to said host at said interface.

18. The automated virtual storage and retrieval library of claim 17, wherein said library manager comprises at least one programmed computer.

19. An automated virtual storage and retrieval library comprising:

a plurality of library cells for storing physical media volumes each physical media volume having from none to a plurality of logical volumes located thereon;

at least one drive unit;

at least one accessor for accessing said library cells and reading labels of said physical media volumes and for transporting said physical media volumes between said drive unit and said cells;

an interface to a host; and a) a library manager connected to said interface and connected for operating said drive unit and said accessor, said library manager having a data base program and a stored table of existing logical volume records and of existing physical volume records wherein said logical volume records and said physical volume records are identified by type identifiers therein, said library manager responding to a command ordering a new inventory;

b) for selecting all said records of said stored table having physical volume record type identifiers;

c) for deleting all selected records in said stored table;

d) for exporting all records remaining in said stored table to a file via said data base program;

e) for erasing said stored table;

f) for initializing a new table;

g) for importing said logical volume records from said file via said data base program into said table;

h) for operating said accessor to scan all said library cells to read said labels of all said physical media volumes in said cells;

i) for inserting physical volume records for said read physical media volumes into said stored table; and for indicating to said host at said interface that said library is online.

20. The automated virtual storage and retrieval library of claim 19, wherein said library manager additionally:

selects said records of said stored table having physical volume record type identifiers; and uploads copies of said selected records to said host at said interface.

21. The automated virtual storage and retrieval library of claim 20, wherein said library manager comprises at least one programmed computer.

22. A computer program product for operating an automated virtual storage and retrieval library for creating a new inventory of physical media volumes and of related logical volumes for said library, the library having a library manager computer with a data base program, a plurality of library cells for storing said physical media volumes each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and an interface to a host, said computer program product comprising:

a computer usable medium having computer readable program code for causing said library manager computer to export all said existing logical volume records to a file via said data base program;

for causing said library manager computer to delete all said existing volume records;

for causing said library manager computer to erase said stored table;

for causing said library manager computer to initialize a new table;

for causing said library manager computer to import said logical volume records from said file via said data base program into said table;

for causing said library manager computer to operate said accessor to scan all said library cells to read said labels of all said physical media volumes in said cells and to insert physical volume records therefor into said stored table; and for causing said library manager computer to indicate to said host that said library is online.

23. The computer program product of claim 22 wherein said computer readable program code additionally comprises code for causing said library manager computer:

at said importing step to additionally delete indexes associated with table; and at said operating step to additionally create new indexes associated with said records in said stored table.

24. A computer program product for operating an automated virtual storage and retrieval library for creating a new inventory of physical media volumes and of related logical volumes therefor, the library having a library manager computer with a data base program, a plurality of library cells for storing said physical media volumes each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records wherein said logical volume records and said physical volume records are identified by type identifiers therein, and an interface to a host, said computer program product comprising:

a computer usable medium having computer readable program code for causing said library manager computer to select all said records of said stored table having logical volume record type identifiers;

for causing said library manager computer to delete all non-selected records in said stored table;

for causing said library manager computer to export all records remaining in said stored table to a file via said data base program;

for causing said library manager computer to erase said stored table;

for causing said library manager computer to initialize a new table;

for causing said library manager computer to import said logical volume records from said file via said data base program into said table;

for causing said library manager computer to operate said accessor to scan all said library cells to read said labels of all said physical media volumes in said cells and to insert physical volume records therefor into said stored table; and for causing said library manager computer to indicate to said host that said library is online.

25. The computer program product of claim 24 wherein said computer readable program code additionally comprises code for causing said library manager computer:

at said importing step to additionally delete indexes associated with said imported records; and at said operating step to additionally create new indexes associated with said records in said stored table.

26. A computer program product for operating an automated virtual storage and retrieval library for creating a new inventory of physical media volumes and of related logical volumes therefor, the library having a library manager computer with a data base program, a plurality of library cells for storing said physical media volumes each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records wherein said logical volume records and said physical volume records are identified by type identifiers therein, and an interface to a host, said computer program product comprising:

a computer usable medium having computer readable program code for causing said library manager computer to select all said records of said stored table having physical volume record type identifiers;

for causing said library manager computer to delete all selected records in said stored table;

for causing said library manager computer to export all records remaining in said stored table to a file via said data base program;

for causing said library manager computer to erase said stored table;

for causing said library manager computer to initialize a new table;

for causing said library manager computer to import said logical volume records from said file via said data base program into said table;

for causing said library manager computer to operate said accessor to scan all said library cells to read said labels of all said physical media volumes in said cells and to insert physical volume records therefor into said stored table; and for causing said library manager computer to indicate to said host that said library is online.

27. The computer program product of claim 26 wherein said computer readable program code additionally comprises code for causing said library manager computer:

at said importing step to additionally delete indexes associated with said imported records; and at said operating step to additionally create new indexes associated with said records in said stored table.

28. An article of manufacture comprising:

a computer usable medium having computer readable program code for operating a library manager computer associated with an automated virtual storage and retrieval library for creating a new inventory of physical media volumes and of related logical volumes for said library, said library manager computer having a data base program, said library having a plurality of library cells for storing said physical media volumes each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and an interface to a host;

said computer readable program code for causing said library manager computer to export all said existing logical volume records to a file via said data base program;

for causing said library manager computer to delete all said existing volume records;

for causing said library manager computer to import said logical volume records from said file via said data base program into said table;

for causing said library manager computer to operate said accessor to scan all said library cells to read said labels of all said physical media volumes in said cells and to insert physical volume records therefor into said stored table; and for causing said library manager computer to indicate to said host that said library is online.

* * * * *